United States Patent
Sakakibara et al.

(10) Patent No.: US 7,337,049 B2
(45) Date of Patent: Feb. 26, 2008

(54) VEHICLE CONTROL APPARATUS

(75) Inventors: Seiji Sakakibara, Okazaki (JP); Fumiharu Ogawa, Okazaki (JP); Toshihiro Shiimado, Okazaki (JP); Masao Kawai, Okazaki (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 549 days.

(21) Appl. No.: 11/060,600

(22) Filed: Feb. 18, 2005

(65) Prior Publication Data
US 2005/0209742 A1 Sep. 22, 2005

(30) Foreign Application Priority Data
Mar. 19, 2004 (JP) ............... 2004-081080

(51) Int. Cl.
*G06F 19/00* (2006.01)
(52) U.S. Cl. .......................... 701/48; 701/91
(58) Field of Classification Search ........... 701/36, 701/37, 41, 48, 49, 51, 70, 91, 101, 102
See application file for complete search history.

(56) References Cited

U.S. PATENT DOCUMENTS

| | | | |
|---|---|---|---|
| 4,715,012 A | 12/1987 | Mueller, Jr. ............ 364/900 |
| 6,161,071 A * | 12/2000 | Shuman et al. ............ 701/48 |
| 6,553,297 B2 * | 4/2003 | Tashiro et al. ............ 701/48 |
| 6,577,937 B1 * | 6/2003 | Shuman et al. ............ 701/48 |
| 6,675,081 B2 * | 1/2004 | Shuman et al. ............ 701/48 |
| 6,816,764 B2 * | 11/2004 | Coelingh et al. ............ 701/37 |
| 6,856,877 B2 * | 2/2005 | Coelingh et al. ............ 701/48 |
| 7,120,529 B2 * | 10/2006 | Coelingh et al. ............ 701/48 |
| 7,212,896 B2 * | 5/2007 | Coelingh et al. ............ 701/48 |
| 2003/0171865 A1 | 9/2003 | Moser et al. ............ 701/48 |
| 2005/0267663 A1 * | 12/2005 | Naono et al. ............ 701/48 |
| 2006/0041360 A1 * | 2/2006 | Post, II ............ 701/48 |

FOREIGN PATENT DOCUMENTS

JP 05-58197 3/1993

* cited by examiner

*Primary Examiner*—Gary Chin
(74) *Attorney, Agent, or Firm*—Bacon & Thomas, PLLC

(57) ABSTRACT

A vehicle control apparatus includes an attribute information collection unit for collecting attribute information relevant to a plurality of units in a vehicle, an environmental information collection unit for collecting environmental information, a required performance detection unit for detecting a required performance necessary for the vehicle based on the collected environmental information, a controlled target determination unit for determining a unit to be controlled based on the collected attribute information and required performance, and a control unit for controlling the unit by calculating a control variable for the unit.

22 Claims, 5 Drawing Sheets

FIG. 3

| REQUIRED PERFORMANCE | ASSIGNING AND WEIGHTING | | | | |
|---|---|---|---|---|---|
| ACCELERATION PERFORMANCE | ENGINE UNIT (1) | TRANSMISSION UNIT (2) | | | |
| DECERELATION PERFORMANCE | ENGINE UNIT (3) | TRANSMISSION UNIT (2) | BRAKE UNIT (1) | | |
| TURNING PERFORMANCE | SUSPENSION UNIT (2) | BRAKE UNIT (3) | | STEERING UNIT (1) | |
| RIDE QUALITY | SUSPENSION UNIT (1) | ENGINE UNIT (2) | TRANSMISSION UNIT (4) | STEERING UNIT (3) | |
| ENERGY-EFFICIENT PERFORMANCE | ENGINE SECTION (3) | TRANSMISSION UNIT (2) | | | MOTOR SECTION (1) |

VEHICLE CONTROL APPARATUS

CROSS-REFERENCE TO RELATED APPLICATIONS

This application claims, under 35 USC 119, priority of Japanese Application No. 2004-081080 filed on Mar. 19, 2004

INCORPORATION BY REFERENCE

The disclosure of Japanese Patent Application No. 2004-081080 filed on Mar. 19, 2004 including the specification, drawings and abstract are incorporated herein by reference in their entirety.

BACKGROUND OF THE INVENTION

1. Field of the Invention

The present invention relates to a vehicle control apparatus with learning based on operations by the driver.

2. Description of the Related Art

The related art includes a vehicle control apparatus for controlling, for example, the engine, suspension, and steering, with learning based on operations by the driver. In this case, learning based on operations by the driver provides for control of the engine, suspension, steering, and/or the like with learning applied to control variable(s) in a program for defining operation of each unit subject to control (refer to, for example, Japanese Unexamined Patent Application Publication No. Hei 5-58197).

In the method of Japanese Hei 5-58197, operations that vary from driver to driver are recognized and each unit, e.g., engine, suspension, and steering, is controlled taking into consideration the differences among the drivers. However, it is not possible to have learning separately applicable to a control parameter uniquely attributable to each controlled unit. Control parameters for the engine, suspension, steering and the like in a given vehicle may change depending on, for example, variations with time, with breakdown, and with replacement of parts. Therefore, there exists a need for learning a control parameter (attribute) for each controlled unit, for example, the engine, suspension, and steering, in order to appropriately control such units. In the aforementioned control apparatus, however, it is not possible to control each unit with learning of its own unique control parameter.

SUMMARY OF THE INVENTION

Accordingly, an objective of the present invention is to provide a vehicle control apparatus that controls a plurality of units based on control parameters attributable to each unit, to appropriately control performance of the vehicle.

Accordingly, the present invention provides a vehicle control apparatus which includes an attribute information collection unit for collecting attribute information relevant to each of a plurality of units in a vehicle, an environmental information collection unit for collecting environmental information, a required performance determination unit for determining an operation (or performance) necessary for the vehicle based on the collected environmental information, target unit determination means for determining a unit to be controlled as a target unit, based on the collected attribute information and the determined performance, and a control unit for controlling the target unit by calculating a control command (parameter) for the target unit.

Attribute information is data for parameters relating to performance or operation of the units.

In one preferred embodiment of the vehicle control apparatus of the present invention, the target unit determination means determines weighting for the target unit to be controlled based on attribute information and the control unit calculates a control command for the target unit based on the determined weighting.

In another preferred embodiment, the target unit determination means determines a unit to be controlled as a target unit, based on a control map that is created on the basis of attribute information and by which the unit to be controlled is set in a manner corresponding to the determined required (necessary) operation (performance).

The control map preferably includes weighting relevant to the unit to be controlled corresponding to the determined required operation (or performance) and the control unit calculates the control variable relevant to the unit based on weighting determined from the map.

In another preferred embodiment the vehicle control apparatus revises a control map each time an accessory signal is turned on.

BRIEF DESCRIPTION OF THE DRAWINGS

FIG. 3 is a table of control operations;

DETAILED DESCRIPTION OF EXEMPLARY IMPLEMENTATIONS

Figure 1:
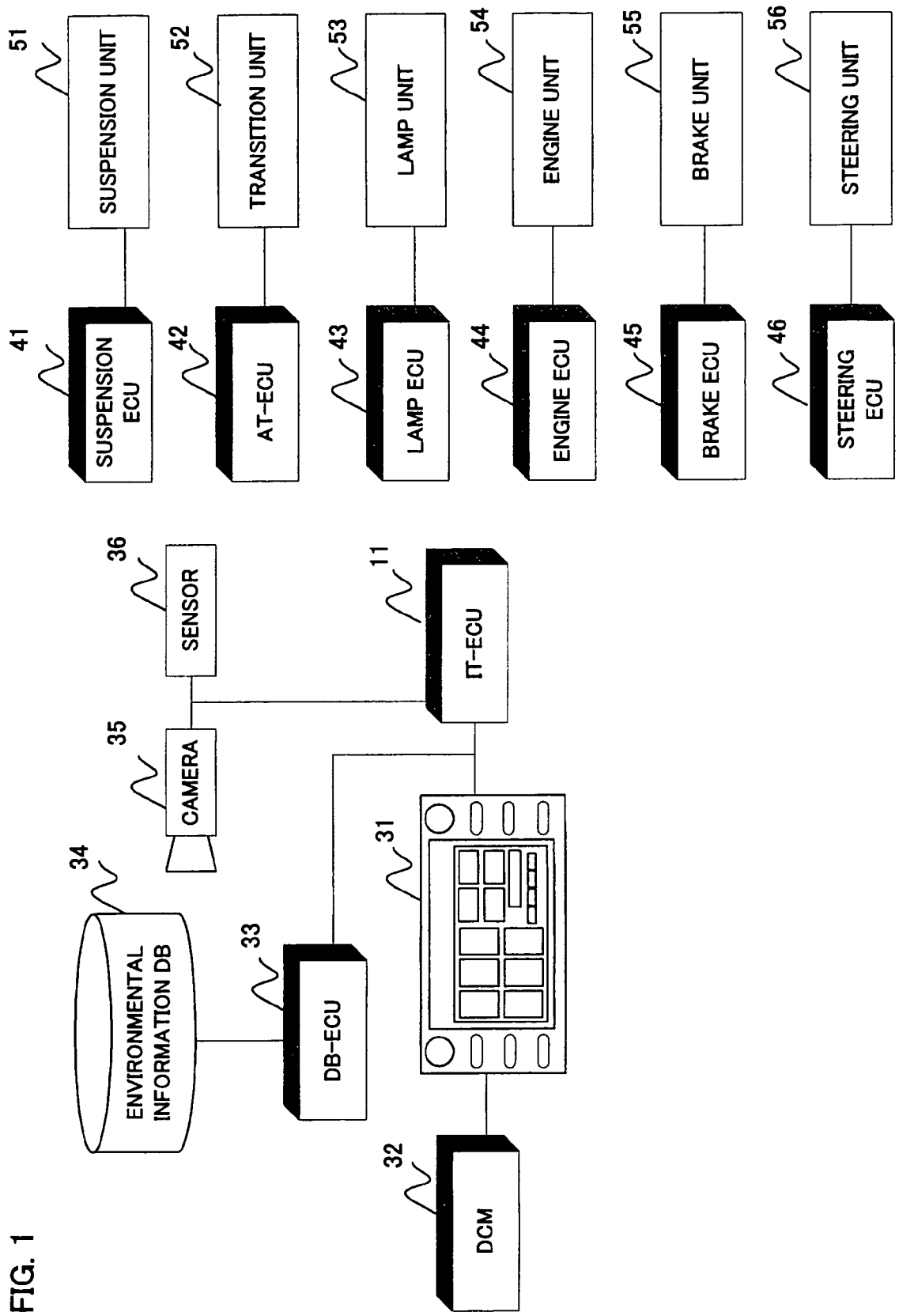
FIG. 1 is a block diagram of the structure of a vehicle control system according to one embodiment of the present invention.

FIG. 1 shows one embodiment of a vehicle control system 10 according to the present invention as including an IT-ECU (Electronic Control Unit) installed on the vehicle. The IT-ECU is a computer system including, for example, a calculation device such as a CPU or MPU, and a storage medium such as a semiconductor memory, a magnetic disk, and/or an optical disk. Although the vehicle may be any type capable of road travel, for example, a passenger car, a truck, a bus, or a tricar, the vehicle is described here as a four wheel passenger car for convenience of explanation.

The vehicle is shown in FIG. 1 as including a suspension unit 51, a transmission unit 52, a lamp unit 53, an engine unit 54, a brake unit 55, and a steering unit 56. The suspension unit 51 may be an assemblage of a plurality of wheel suspensions (wheel suspension units). Each wheel suspension unit may include a suspension link, spring, damper and the like and be individually attached to each wheel. The spring constant of the spring, the damping force, and/or the like may be adjusted in control of the suspension unit 51. Further the suspension unit 51 may be controllable as a height adjustment apparatus for adjusting the vehicle height. The suspension unit 51 may be a combination of independent suspension units whereby right wheel and left wheel suspensions perform independently, or a rigid suspension wherein the right and left wheels are connected by an axle with a unified suspension of the axle. Further the suspension link may be any type, for example, a multi link or a double wishbone link. Likewise, the spring may be any type, for example a coil spring, a leaf spring, or an air spring and the damper also may be any type, for example, a hydraulic type or a frictional type.

The transmission unit 52 is an automatic transmission for transfer of power to the drive wheels with adjustment of torque and speed. Thus, the transmission unit 52 adjusts gear ratio in transfer of torque output of the engine 54 and may be gearing with shifting of gear ratios or an automatic stepless speed change device for changing the transmission ratio smoothly over a continuous range. Such a stepless speed change device typically includes two (2) V pulleys attached to an input shaft and an output shaft, respectively, a reinforced elastomer V belt or a metal V belt of linked metal blocks, mounted around the two V pulleys, and changes speed (gear) ratio by adjusting the gap between inclined planes of at least one V pulley. However, other types of stepless speed change devices may be used instead, for example, a stepless speed change device with chains instead of V belts. Further the transmission unit 52 may be any type of gear transmission, for example, a transmission including a planetary gear unit or a transmission unit including a gear pair with parallel axes, clutches, and the like.

The lamp unit 53 represents a plurality of lamps, for example, head lights, indicator lights, fog lamps, and turn signals. The lamp unit 53 may further include a dashboard (instrument panel), e.g., directional turn signals, and lamps attached to the rear of the vehicle, for example, brake lights, fog lamps, and turn signals. The lamp unit 53 can not only turn lights on/off, but also adjust lighting intensity, light distribution, light direction, and the like.

The engine 54 is a power source which generates drive torque at its output shaft which serves as input to the transmission unit 52. The engine 54 is typically an internal combustion engine, but it may be an electric motor or a hybrid type power plant that is a combination of an internal combustion engine and an electric motor. Further the internal combustion engine is typically a reciprocating piston engine, but it may be a rotary engine or a gas-turbine engine. Fuels used in such engines include, for example, gasoline, diesel oil, ethanol, methanol, natural gas, propane gas, and hydrogen gas. Further, the engine may be one which operates with Otto cycle, diesel cycle, or stirling cycle.

The brake unit 55 may be any device(s) or system conventionally used for stopping rotation of wheels. The brake unit 55 may include disk brake units individually attached to the wheels and/or drum brake units, individually attached to respective wheels, and a hydraulic circuit for operation of each wheel brake unit, and wire structure. The hydraulic circuit typically includes a device for increasing the force generated by operation of a brake pedal by a driver. Further the hydraulic circuit may include a control valve for controlling the operating pressure transferred to each actuator for a wheel brake unit for rapid braking without locking of the wheels. The brake unit 55 may also include an emergency brake device (parking brake) for stopping a vehicle.

The steering unit 56 may be a conventional vehicle steering unit which changes the toe angle of the front wheels to thereby change direction of travel of the vehicle. The steering unit 56 may include a steering wheel rotated by the driver, a steering shaft for transferring rotation of the steering wheel, a steering gearbox for converting the rotation of the steering shaft into right and left linear motion, a tie-rod for transferring the right and left linear motion to the front wheels, and a knuckle arm that is attached to the front wheel axle and which rotates around a kingpin with the front wheels. The steering unit 56 may be a power steering system which increases the force generated by rotation of the steering wheel. The power steering unit may be a hydraulic type which generates auxiliary control force as hydraulic pressure or an electronic type which generates auxiliary control force utilizing an electric motor or an electromagnet. Then the steering gearbox may be a variable gear ratio type for changing gear ratio depending on rudder of a steering wheel or a fixed gear ratio type.

The suspension unit 51 is controlled by sus-ECU 41, the transmission unit 52 is controlled by AT-ECU 42, lamp unit 53 is controlled by lamp-ECU 43, the engine 54 is controlled by engine ECU 44, the brake unit 55 is controlled by brake ECU 45, and the steering unit 56 is controlled by steering ECU 46. Note that, the sus-ECU 41, the AT-ECU 42, the lamp-ECU 43, the engine ECU 44, the brake ECU 45, and the steering ECU 46 are types of computers including, for example, a calculation device such as a CPU and MPU, a storage medium such as a semiconductor memory, a magnetic disk, and/or an optical disk, and a communication interface and the like.

The sus-ECU 41 may control, for example, the spring constant, damping force, and/or a vehicle height adjustment of the suspension unit 51 independently supporting each wheel. In this case, the sus-ECU 41 may store attribute information relating to the suspension unit 51 in a storage medium, which attribute information may relate to, for example, damping, response, variable range of vehicle height, spring constant, and/or variation of vertical acceleration calculated based on output values from a vertical acceleration sensor as described later. The AT-ECU 42 controls the gear ratio of the transmission unit 52 and, to enable this function, stores attribute information, for example, general vehicle information such as weight and size of the vehicle, type and format of the transmission unit 52, torque capacity, control parameter information (data), and variable range of transmission shock calculated based on output values from a GYRO sensor as later described. Note that, if the transmission unit 52 is a stepless speed change device, control parameter (attribute) data may include, for example, range of the transmission and transmission input and output speeds. If the transmission unit 52 is a gear transmission the number of gears, gear ratio, and the like may be included as control parameter (attribute) information.

The lamp ECU 43 may control, for example, the turning of lights on and off, lighting intensity, light distribution, and light direction. The lamp ECU 43 may store attribute information relating to the lamp unit 53 in a storage medium, for example, lighting intensity, horizontal and/or vertical direction, and response speed.

The engine ECU 44 may control, for example, rotational speed and torque output of the engine unit 54. In this case, the engine ECU 44 stores attribute information (data) relating to the engine unit 54 in the storage medium, which data may include, for example, number of cylinders, engine type (for example, V, in-line, or direct-injection), throttle characteristics, variable range of the throttle, fuel attributes, power attributes, and efficiency map(s).

The brake ECU 45 controls each brake device of the brake unit 55. For this purpose, the brake ECU 45 stores attribute information relating to the brake unit 55, for example, attributes of each brake device, deceleration values and amount of remaining brake pad. The deceleration value and amount of remaining brake pad are calculated based on output of information for brake hydraulic pressure and output from a vehicle speed sensor as described later.

The steering ECU 46 may control the auxiliary control force generated by the power steering device of the steering unit 56 and gear ratio of the steering gearbox. For this purpose, the steering ECU 46 stores attribute information relating to the steering unit 56 in the storage medium, for example, auxiliary control force of the power steering device, steering type such as hydraulic or electric, variable range of reaction force, and variable range of gear ratio.

The sus-ECU 41, the AT-ECU 42, the lamp ECU 43, the engine ECU 44, the brake ECU 45, and the steering ECU 46 are connected with the IT-ECU 11 for transmitting attribute information, concerning the units which they respectively control, to the IT-ECU 11, and respectively control the suspension unit 51, the transmission unit 52, the lamp unit 53, the engine unit 54, the brake unit 56, and the steering unit 56 according to control signals output by the IT-ECU 11. In the present embodiment the attribute information includes information unique to each unit.

Further, the IT-ECU 11 may receive environmental information as inputs from a camera 35 and a sensor 36. The camera 35 mounted on the front of the vehicle may include an imaging system, for example, a CCD (Charge Coupled Device) and a CMOS (Complementary Metal Oxide Semiconductor). The camera 35 may photograph, for example, a vehicle which is traveling ahead in order to determine its distance from the vehicle on which the camera is mounted, the centerline painted on the road surface in order to determine tracking of the vehicle relative to the centerline, and the road surface to determine its condition. Alternately or additionally, the camera 35 may also be attached to the rear end of the vehicle to obtain a clear range of vision in backing the vehicle.

The sensor 36 may include, for example, a GPS antenna for receiving GPS signals from a GPS (Global Positioning System) satellite, a vehicle speed sensor for detecting vehicle speed, a GYRO sensor for detecting attitude of the body of the vehicle, a shift position sensor for detecting operation of a shift position switch or lever by a driver, a brake sensor for detecting operation of the vehicle brake pedal by the driver, an emergency brake sensor for detecting an operation of a vehicle emergency brake by the driver, a throttle sensor for detecting throttle opening, a steering sensor for detecting vehicle steering rudder, a lamp switch sensor for detecting operation of switches for head lamps, small lamps, fog lamps, and a vertical acceleration sensor for detecting vertical acceleration of the vehicle.

The IT-ECU 11 may be connected with an environmental information database 34 via a DB-ECU 33. The environmental information database 34 may include a storage medium, for example, a magnetic tape, a magnetic disk, a magnetic drum, a flash memory, a CD-ROM, a MD, a DVD-ROM, an optical disc, a MO, an IC card, an optical card, or a memory card. Various types of environmental information files may be stored in the storage medium, for example, a map data file, an intersection data file, a node data file, a road data file, and a POI (Point of Interest) data file with facility information such as that for hotels and gas stations in each area. As used herein, "environmental information" is information concerning condition of the vehicle and the road.

The road condition may be determined from data in the intersection data file, node data file, and road data file. The intersection data may include data indicating the type of each intersection, that is, data indicating whether or not a traffic light is installed. Node data represents at least the location and shape of roads in the map data stored in the map data file, and node data may further include data indicating, for example, branch points (including intersections and T junctions), node points, and actual road links between adjacent node points. The node points also serve to indicate bends in the road.

Road data may include data indicating properties of the roads themselves, for example, road width, slope, cant, altitude, banking, condition of the road surface, the number of lanes, a point at which the number of lanes decreases, and a point at which the width decreases. In the case of an expressway or a trunk road, a set of lanes in one direction may be stored as road data and another set of lanes in the opposite direction may be separately stored as other road data, that is, each expressway or trunk road is treated as a double road. More specifically, a trunk road having two or more lanes in each direction is regarded as a double road, and a set of inbound lanes and a set of outbound lanes may be stored as separate road data. Road data may further include corner data indicating the radius of curvature, an intersection, a T-junction, and/or approach to a corner. Road data may further include information for, for example, railroad crossings, expressway entrances and exits, tollgates, upgrades, downgrades, and types of road (for example, federal interstate expressways, state roads, county roads, and expressways). The map data file stores map information, for example, nodes, links, coordinates, and names of facilities, which data is retrieved for drawing a map.

The POI (Point of Interest) data file may store, for example, facility data, telephone directory data, and event data to be utilized in searching for a departure point, a stopping point, a point to be visited, and the like. Note that, the POI data file may include detailed information relating to facilities and regions. For example, if a dining place such as a restaurant or café is stored as facility information, information such as days open for business, business hours, telephone number, menu, prices, quality of service, ambience, and parking space may be stored as detailed information relating to the facility information. If a commercial facility such as a convenience store, a department store, a do-it-yourself store, or a supermarket is stored as facility information, information such as days open for business, business hours, telephone number, goods available for purchase, prices, period of special sale, bargain priced goods, quality of service, ambience, parking space availability, and content and period for any special event may be stored as detailed information relating to the facility information. If information for an amusement facility such as a theme park, an amusement arcade, a theater, or a playhouse is stored as facility information, that information would include days open for business, business hours, telephone number, contents of the facility, prices, quality of service, ambience, availability of parking space, and content and period of special events, etc.

The DB-ECU 33 is a computer which includes, for example, a calculation device such as a CPU and MPU, a storage medium such as a semiconductor memory, a magnetic disk or an optical disk, and a communication interface. The DB-ECU may control an operation of the environmental information database 34, store data in the environmental information database 34, and further search and obtain data from the database. The environmental information database 34 may be built into the DB-ECU 33.

The IT-ECU 11 may include a current location detecting means for obtaining environmental information from the camera 35, the sensor 36, and the environmental information database 34 and for detecting the current location of the vehicle. Further, based on the current position of the vehicle and road shape, it is possible to calculate an appropriate gear ratio for the transmission unit 52 and to learn points where the vehicle has experienced a shock, for example, a point of connection of paved roads, a bump in the road (speed bump, grooves, obstacles, etc.) and the like.

Further the IT-ECU 11 may be connected with a portable information device 31 operated by the driver or an assistant driver. The portable information device 31 may include, for example, a calculation device such as a CPU and MPU, a storage medium such as a semiconductor memory, a magnetic disk, or an optical disk, a display device such as a liquid crystal display, a LED (Light Emitting Diode) display, or a CRT, an input device such as a keyboard, a joystick, a cross-shape key, a push button, a remote control apparatus, or a touch panel, a display control device for controlling the display device, and further a communication interface.

The portable information device 31 may be connected with a DCM (Data Communication Module) 32 for automobile use. The DCM 32 is a device for executing data communication by connecting with a network (not shown). The network may be, for example, the Internet, a wireless or wired public communication line network, a private communication network, an intranet, a LAN (Local Area Network), a WAN (Wide Area Network), a portable phone system network, a PHS (Personal Handy-Phone System) telephone network, or a combination of a plurality of such communication networks. Thus, the DCM 32 may be a wireless LAN device for communicating with access points utilizing a wireless LAN system, a portable phone, a PHS phone or any type of telephone capable of data communication with a network.

Further, the portable information device 31 may include: a current location display for, when the current location of the vehicle is detected by the IT-ECU 11, displaying the current location on a map; route search means for searching for a route to a destination as well as a conventional vehicle navigation apparatus; and route guidance means for providing guidance along the searched route. Further, the portable information device 31 may include browsing means for browsing Web pages on the Internet as a typical personal computer does. The portable information device 31 may also include a scheduler for creating schedule data by using personal information management software such as a PIM (Personal Information Manager) which is typically contained in a personal computer or PDA (Personal Digital Assistant), so that it is possible to create an agenda, an appointment book, or the like. The environmental information database 34 may also include file operation means for operating files stored therein and various files stored in a storage medium.

Figure 2:
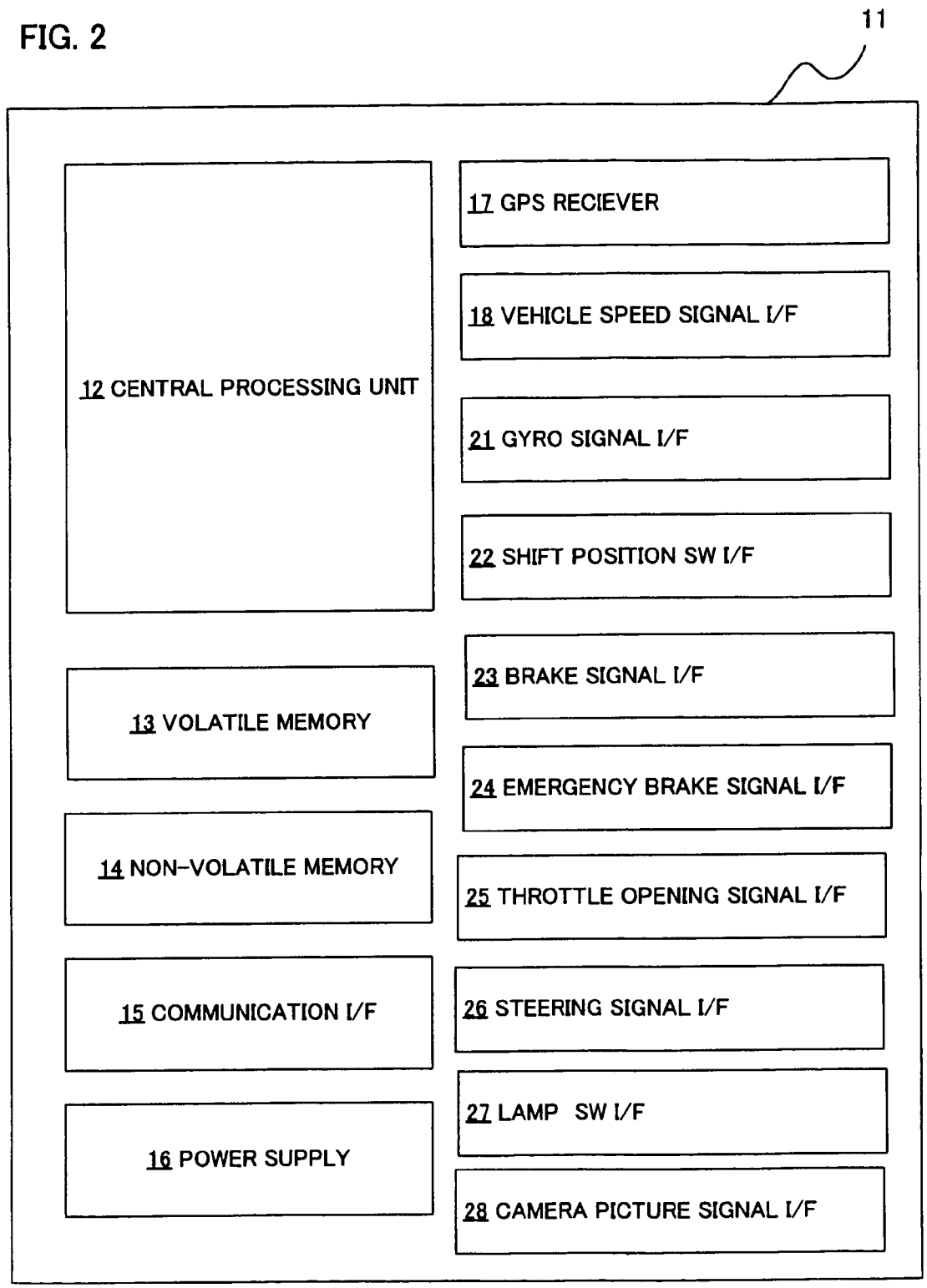
FIG. 2 is a block diagram showing structure of the IT-ECU of the embodiment of FIG. 1.

The structure of the IT-ECU 11, according to one embodiment of the present invention, is illustrated in detail in FIG. 2. As shown in FIG. 2, the IT-ECU 11 may include a central processing unit 12 for executing various calculations, a volatile memory 13 which serves as a working memory for the central processing unit 12 in executing various calculations, a non-volatile memory 14 which serves as a storage medium for storing various programs, for example, a control program used for controlling operation of the central processing unit 12, a communication interface 15 for communicating with remote devices such as other ECU, and an electric source 16 for supplying electric power to the central processing unit 12, the volatile memory 13, the non-volatile memory 14, the communication interface 15, and the like.

The IT-ECU 11 may further include a GPS receiver 17 for receiving GPS signals from a GPS antenna of the sensor 36; a vehicle speed signal interface 18 for receiving vehicle speed signals from a vehicle speed sensor; a GYRO signal interface 21 for receiving gyroscopic signals from a GYRO sensor; a shift position switch interface 22 for receiving shift position switch signals from a shift position sensor; a brake signal interface 23 for receiving brake signals from a brake sensor; an emergency brake signal interface 24 for receiving emergency brake signals from an emergency brake sensor; a throttle opening signal interface 25 for receiving throttle opening signals from a throttle sensor; a steering signal interface 26 for receiving steering signals from a steering sensor; a lamp switch interface 27 for receiving lamp switch signals from a lamp switch sensor; and a camera picture signal interface 28 for receiving picture signals taken by the camera 35.

The IT-ECU 11 may communicate with the other ECU, that is, the sus-ECU 41, the AT-ECU 42, the lamp ECU 43, the engine ECU 44, the brake ECU 45, and the steering ECU 46 to obtain attribute information for various units, e.g., is, the suspension unit 51, the transmission unit 52, the lamp unit 53, the engine unit 54, the brake unit 55, and the steering unit 56. Further the IT-ECU 11 may obtain environmental information from the camera 35, the sensor 36, and the environmental information database 34. Environmental information may represent, for example, driving environmental information which is output by the camera 35 such as road surface condition and following distance, driving condition information as vehicle information which is output by the sensor 36, and information for the vicinity around the traveling vehicle stored in the environmental information database 34, including intersection data and road data. More specifically, the intersection data and road data may include information about, for example, the angle at which roads meet at an intersection, number of lanes, and pitch, and radius of curvature of a corner. Then the IT-ECU 11 judges vehicle performance based on the attribute information and environmental information, determine which unit(s) needs to be controlled, calculates control variable (parameter) for the unit to be controlled, and then executes control of the unit by transfer of the calculated control variable to the corresponding ECU.

Thus, the IT-ECU 11 comprises an attribute information collection unit for collecting unit attribute information; an environmental information collection unit for collecting environmental information; a performance determination unit for determining performance required for a vehicle based on environmental information; a controlled target determination unit for determining a unit to be controlled based on attribute information; and a control unit for controlling the unit by calculating a control variable parameter relevant to the unit. More specifically, the controlled target determination unit determines weighting for the unit to be controlled based on attribute information. Further the controlled target determination unit determines the unit to be controlled based on a control map that is created on the basis of attribute information and in which the unit to be controlled is set corresponding to the required performance. Then control unit calculates a control variable (parameter) for the unit based on weighting.

Figure 4:
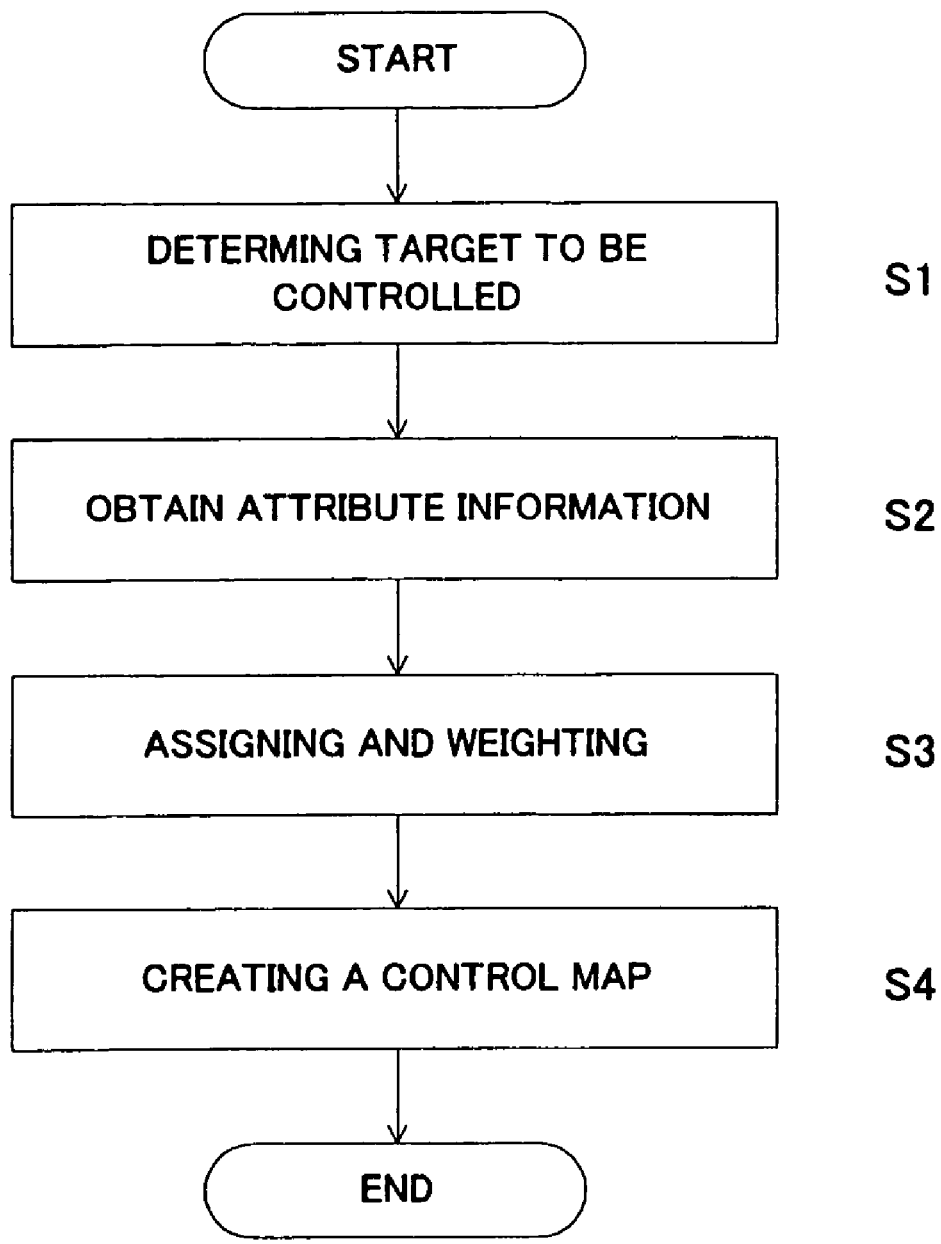
FIG. 4 is a flowchart of a program for creation of a control map for a vehicle control system.

Next, operation of the vehicle control system 10 with the structure described above will be explained. First, creation of a control map for determining a unit to be controlled is described with reference to FIGS. 3 and 4.

Start: In starting creation of a control map, when the driver of the vehicle turns on an accessory signal switch (not shown) on, electric power is supplied to the vehicle control system 10 so that the system is activated. The accessory signal switch may be integrated with the vehicle engine switch and be turned on/off by a driver with an ignition switch key.

Step S1: The IT-ECU 11 determines which units need to be controlled and which units are installed in a vehicle as target units to be controlled. The suspension unit 51, the transmission unit 52, the lamp unit 53, the engine unit 54, the brake unit 55, and the steering unit 56 will be described here as target units to be controlled.

Step S2: The IT-ECU 11 communicates with the sus-ECU 41, the AT-ECU 42, the lamp ECU 43, the engine ECU 44, the brake ECU 45, and the steering ECU 46 to obtain attribute information concerning units respectively controlled by these ECUs, i.e., the suspension unit 51, the transmission unit 52, the lamp unit 53, the engine unit 54, the brake unit 55, and the steering unit 56.

Step S3: The IT-ECU 11 executes assigning and weighting for each unit according to required performance for the vehicle based on attribute information (Step S3), creates a control map as shown in FIG. 3 (Step S4), and then terminates the processing of creating the control map. Note that the control map may be stored in a storage medium, for example, the volatile memory 13 of the IT-ECU 11. The IT-ECU 11 may then execute control by referring to the control map as described later.

In present embodiment, performance required of the vehicle may be categorized into, for example, acceleration performance, deceleration performance, corner turning performance, ride quality, and energy-efficiency. The required performance may be categorized in a different manner or be subcategorized. In the in the control map as shown in FIG. 3, units may be added corresponding to the paramount for each performance, that is, acceleration performance, deceleration performance, corner turning performance, ride quality, and energy efficiency, and the parameter for each corresponding unit may be weighted. In the example of FIG. 3, numbers indicating level of importance are assigned as weighting for target units to be controlled. The smaller the number, the heavier weighting for a given unit. More specifically, smaller numbers indicate greater importance. Note that assigning of units and weighting thereof according to performance required of each unit, based on attribute information concerning each unit.

For example, the engine unit 54 and the transmission unit 52 are coordinated for acceleration performance. If the engine unit 54 can generate driving force greater than or equal to a prescribed value and whose displacement is greater than or equal to a prescribed amount, for example, a gasoline engine, and further if the transmission unit 52 is gear transmission, (1) in FIG. 3 denotes weighting for the engine unit 54 and (2) denotes weighting for the transmission unit 52. More specifically, fuel injection rate may be the main control parameter because it affects output of the gasoline engine. Therefore it is possible to reduce the number of gear stages to be shifted through in kick down of the gear transmission.

On the other hand, if the engine unit 54 cannot generate driving force up to a prescribed value and whose displacement is less than a prescribed amount, for example, a gasoline engine, and further if the transmission unit 52 is a stepless speed change device, (2) denotes weighting for the engine unit 54 and (1) denotes weighting for the transmission unit 52. More specifically, fuel injection rate is not changed and the transmission ratio of the stepless speed change device is controlled for acceleration.

The engine unit 54, the transmission unit 52, and the brake unit 55 are coordinated for deceleration performance. In FIG. 3 (1) denotes weighting for the transmission unit 52 and (2) denotes weighting for the brake unit 55. For the case wherein the engine unit 54 is capable of generating a driving force greater than or equal to a prescribed value and has a displacement which is greater than or equal to a prescribed amount, for example, a reciprocating gasoline engine and, further the weight of the vehicle is less than a prescribed amount, a high-power emergency brake can be obtained with control of the transmission ratio of the transmission unit 52 so that it is made the main object of control and, if deceleration was not sufficient for the previous occasion of emergency braking, the brake unit 55 is subsidiarily controlled to produce an additional braking force.

On the other hand (2) in FIG. 3 denotes weighting for the transmission unit 52 and (1) denotes weighting for the brake unit 55 for the case wherein the engine unit 54 is incapable of generating a driving force as great as the prescribed value, the displacement of the engine is less than the prescribed amount (for a reciprocating gasoline engine), and the weight of the vehicle is greater than or equal to the prescribed amount. More specifically, a high-power emergency brake can not be obtained by control of the transmission ratio of the transmission unit 52 so that it is secondarily controlled when the deceleration was not sufficient the last occasion of emergency braking and the brake unit 55 then becomes the main object of control so as to produce braking force at the beginning of deceleration.

FIG. 3 represents an example wherein a hybrid power plant is used as the engine unit 54. Thus engine unit 54 in FIG. 3 may consist of an internal combustion as an engine section and an electronic motor as a motor section.

In the present invention, each time the vehicle control system 10 is activated, the IT-ECU 11 determines which unit is to be a target of control and creates a control map with attribute information for the unit. Thus even if attribute information for the controlled unit is changed because of replacement or adjustment of the components of the unit, a control map corresponding to the changed attributes is automatically created and ready for use. Further even if attribute information for the unit is changed on account of breakdown of the parts of the unit or degradation of the quality of components due to change over time, a control map corresponding to the new attribute information can be also automatically created and ready for use.

Figure 5:
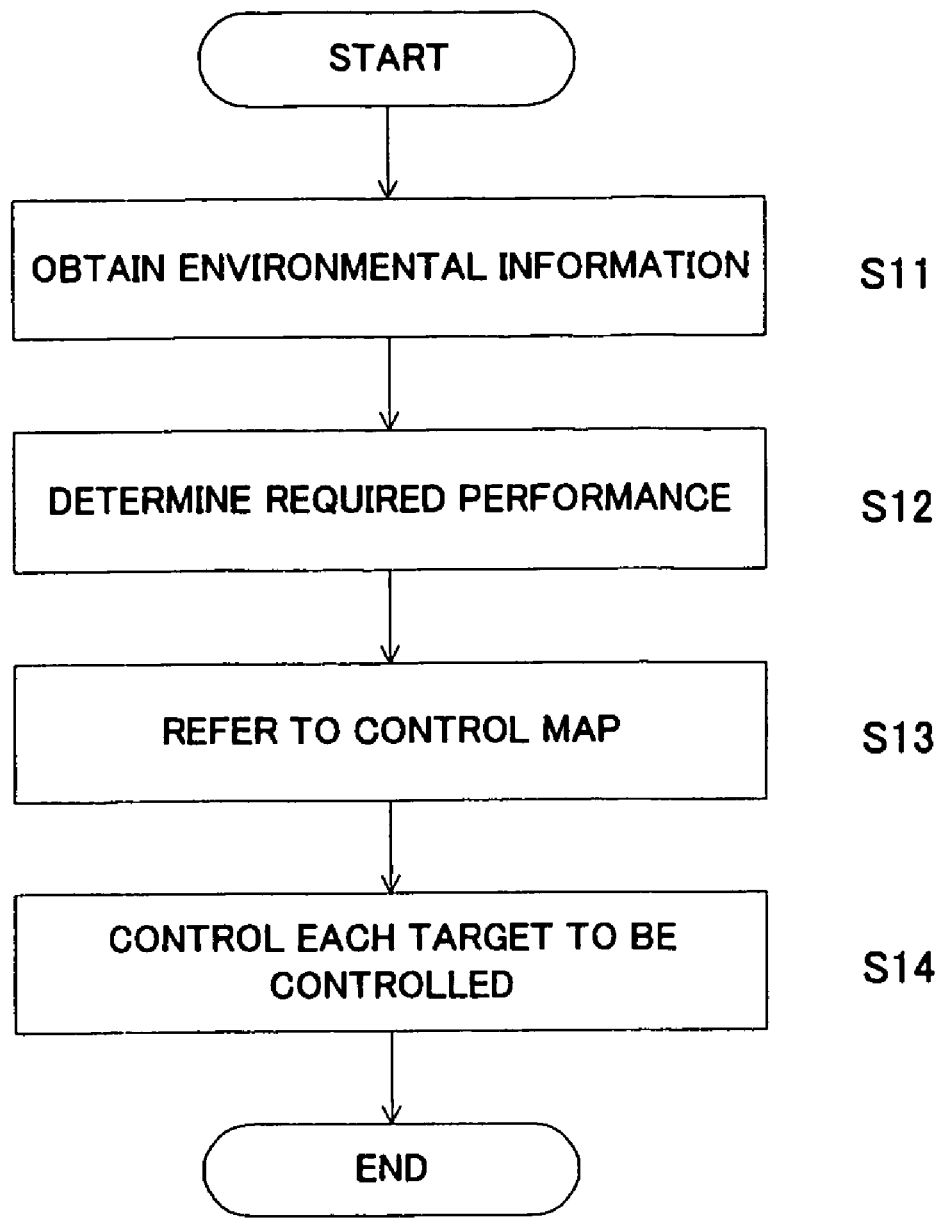
FIG. 5 is a flowchart of a routine for control of a vehicle unit.

FIG. 5 illustrates a routine for controlling units of a vehicle control system in the present invention. As described above, after creating and storing the control map, the IT-ECU 11 may obtain environmental information from the camera 35, the GPS antenna, the vehicle speed sensor, the GYRO sensor, the shift position sensor, the brake sensor, the emergency brake sensor, the throttle sensor, the steering sensor, the lamp switch sensor 36, and the environmental information database 34 (Step S11). Then the IT-ECU 11 determines the performance required for the vehicle based on environmental information (Step S12). Subsequently the IT-ECU 11 refers to the control map (Step S13), determines a unit to be controlled in accordance with the required performance, and calculates a control variable for the unit depending on weighting for the unit. Then the IT-ECU 11 orders the corresponding ECU of the unit to use the control variable in controlling the unit. In this manner, each target unit is controlled and then the routine is terminated (Step S14).

For example, if the IT-ECU 11 determines, based on environmental information, that there is a corner ahead in the direction of travel of the vehicle, an upper limit for vehicle speed in entering the corner is calculated based on the current vehicle speed and the corner shape such as radius of curvature and slope (pitch). Then when it is detected short of the corner that the driver has closed the throttle, the IT-ECU 11 starts control for approaching the corner. The IT-ECU 11 may refer to a control map to calculate control variables for both the transmission unit 52 and the brake unit 55. Then each control variable is transferred to the AT-ECU 42 and the brake ECU 45 at a prescribed amount of time before the vehicle enters the turn around the corner, so that the transmission unit 52 and the brake unit 55 are properly controlled during the turn.

When the driver inputs settings for each unit, the IT-ECU 11 calculates control variables in consideration of those settings. For example, if the driver inputs a setting for hardening the suspension unit 51, the IT-ECU 11 may calculate a control command signal to harden the suspension unit 51.

As described above, the IT-ECU 11 of the present invention may create a control map based on attribute information each time a vehicle starts travel, that is, when an accessory signal switch is turned on to activate the vehicle control system 10, and a control variable for each unit is calculated by referring to the control map. Thus, even if attributes of the units are changed by, for example, replacement of parts, adjustment, breakdown, or variation over time, it is possible to appropriately control a unit corresponding to its attribute.

Then the IT-ECU 11 may judge the required performance based on environmental information, determine a unit to be controlled dependent on the determined performance requirements, and then calculate a control variable for each unit corresponding to the weighting for that unit. Therefore, it is possible to properly adjust and control a plurality of units in accordance with the driving environment and/or traveling conditions.

Further the IT-ECU 11 may include current location detecting means for detecting the current location of the vehicle so that each unit may be appropriately controlled in accordance with to the shape of the road on which the vehicle is currently traveling and by predicting the shape of the road ahead, in the direction of travel. The embodiment described above may also include, for example, a seatbelt unit and a seat unit.

In the present invention, the weighting of each target unit to be controlled in a control map indicates level of importance of that unit. However, weighting also could be information indicating, for example, command signals for controlling units and control ratio for the unit corresponding to its required performance. For example, if weighting for acceleration performance is set (1) for the engine unit 54 and (2) for the transmission unit 52 and further if the weighting also indicates the order of controlling the units, the engine unit 54 is first controlled (primary control) and the transmission unit 52 is secondarily controlled. If weighting relevant to acceleration performance is set (3) for the engine unit 54 and (1) for the transmission unit 52 and further if weighting here also indicates the control ratio for each unit corresponding to required performance, the engine unit 54 and the transmission unit 52 are controlled by a ratio of 3:1 corresponding to the required acceleration, i.e. 75% of the required acceleration is provided by increasing the output of the engine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle control apparatus for mounting on a vehicle, comprising:
   (a) an attribute information collection unit for collecting attribute information relevant to a plurality of units in a vehicle;
   (b) an environmental information collection unit for collecting environmental information;
   (c) a required performance detection unit for detecting a required operation of the vehicle based on the collected environmental information;
   (d) a controlled target determination unit for determining, as a target unit, at least one unit to be controlled based on the collected attribute information and the detected required operation; and
   (e) a control unit for controlling determined target units, by calculating a control command for each target unit.

2. The vehicle control apparatus according to claim 1, wherein:
   (a) said controlled target determination unit determines weighting for each target unit, based on the collected attribute information; and
   (b) said control unit calculates a control command for each target unit, based on the weighting.

3. The vehicle control apparatus according to claim 1, wherein the controlled target determination unit determines a target unit based on a control map that is created on the basis of attribute information and in which the target unit is set corresponding to the detected required operation.

4. The vehicle control apparatus according to claim 3, wherein:
   (a) said control map includes weighting for said target units in a manner corresponding to the detected required operation; and
   (b) said control unit calculates at least one control command for each target unit based on the weighting.

5. The vehicle control apparatus according to claim 3, wherein said control map is created each time an accessory signal switch is turned on.

6. The vehicle control apparatus according to claim 5, wherein:
   (a) said control map includes weighting for said target units in a manner corresponding to the detected required operation; and
   (b) said control unit calculates at least one control command for each target unit based on the weighting.

7. The vehicle control apparatus according to claim 4:
   wherein the target units are an engine and a transmission;
   wherein the detected required operation is required acceleration; and
   wherein said weighting determines the extent to which operation of each of the engine and transmission is to be changed to achieve the required acceleration.

8. The vehicle control apparatus according to claim 1, wherein:
   the target unit is selected from an engine, a transmission, a suspension system, a braking system, a steering unit, and a lamp unit.

9. The vehicle control apparatus according to claim 1:
   wherein the target unit is a braking system;
   wherein the attribute information includes information for at least one attribute selected from deceleration value and remaining pad; and
   wherein the detected required operation is deceleration.

10. The vehicle control apparatus according to claim 1:
wherein said target unit is a power steering unit including a steering gear box;
wherein the attribute information includes auxiliary force generated by the power steering unit, type of power steering unit, and range of gear ratio of the steering gearbox; and
wherein the detected required operation is at least one of the generation of the auxiliary force and change of the gear ratio.

11. The vehicle control apparatus according to claim 1:
wherein the target unit is a suspension system;
wherein the attribute information includes data for at least one of spring constant, damping force and vehicle height; and
wherein the detected required operation is at least one of adjustment of vehicle height, change of spring constant and adjustment of damping force.

12. The vehicle control apparatus according to claim 1:
wherein the target unit is a transmission;
wherein the attribute information includes data for at least one of transmission input speed, gear or speed ratio and transmission output speed; and
wherein the detected required operation is a change of at least one of transmission input speed, gear or speed ratio and transmission output speed.

13. The vehicle control apparatus according to claim 1:
wherein the target unit is a lamp unit;
wherein the attribute information includes data for at least one parameter selected from lighting intensity, light direction, light distribution and on/off; and
wherein the detected required operation is a change in said at least one parameter.

14. The vehicle control apparatus according to claim 1:
wherein the target unit is an engine;
wherein the attribute information includes data for at least one parameter selected from number of cylinders, engine type, throttle characteristic, throttle range, fuel type and efficiency maps; and
wherein the detected required operation is a change in the output rotational speed or output torque of the engine.

15. The vehicle control apparatus according to claim 1 wherein said environmental information collection unit includes:
at least one of a GPS signal receiver, a gyro sensor, a shift position sensor, a brake sensor, an emergency brake sensor, a throttle sensor, a lamp switch sensor and a vertical acceleration sensor; and
a database containing at least one file of data selected from:
a road data file including data for at least one of road width, slope, cant, altitude, banking, condition of the road surface, number of lanes, point at which the number of lanes increases or decreases and a point at which a road widens or narrows;
a map data file including data for at least one of modes, links, coordinates, and names of facilities; and
a point-of-interest file including data for at least one of facilities, telephone directory and events.

16. The vehicle control apparatus according to claim 1 wherein said environmental information collection unit includes at least one camera for providing at least one distance to a vehicle ahead, tracking of the vehicle rotation to the centerline, condition of the road surface and field of vision to the rear of the vehicle.

17. The vehicle control apparatus according to claim 9 wherein said environmental information collection unit includes:
at least one of a GPS signal receiver, a gyro sensor, a shift position sensor, a brake sensor, an emergency brake sensor, a throttle sensor, a lamp switch sensor and a vertical acceleration sensor; and
a database containing at least one file of data selected from:
a road data file including data for at least one of road width, slope, cant, altitude, banking, condition of the road surface, number of lanes, point at which the number of lanes increases or decreases and a point at which a road widens or narrows;
a map data file including data for at least one of nodes, links, coordinates, and names of facilities; and
a point-of-interest file including data for at least one of facilities, telephone directory and events.

18. The vehicle control apparatus according to claim 10 wherein said environmental information collection unit includes:
at least one of a GPS signal receiver, a gyro sensor, a shift position sensor, a brake sensor, an emergency brake sensor, a throttle sensor, a lamp switch sensor and a vertical acceleration sensor; and
a database containing at least one file of data selected from:
a road data file including data for at least one of road width, slope, cant, altitude, banking, condition of the road surface, number of lanes, point at which the number of lanes increases or decreases and a point at which a road widens or narrows;
a map data file including data for at least one of nodes, links, coordinates, and names of facilities; and
a point-of-interest file including data for at least one of facilities, telephone directory and events.

19. The vehicle control apparatus according to claim 11 wherein said environmental information collection unit includes:
at least one of a GPS signal receiver, a gyro sensor, a shift position sensor, a brake sensor, an emergency brake sensor, a throttle sensor, a lamp switch sensor and a vertical acceleration sensor; and
a database containing at least one file of data selected from:
a road data file including data for at least one of road width, slope, cant, altitude, banking, condition of the road surface, number of lanes, point at which the number of lanes increases or decreases and a point at which a road widens or narrows;
a map data file including data for at least one of nodes, links, coordinates, and names of facilities; and
a point-of-interest file including data for at least one of facilities, telephone directory and events.

20. The vehicle control apparatus according to claim 12 wherein said environmental information collection unit includes:
at least one of a GPS signal receiver, a gyro sensor, a shift position sensor, a brake sensor, an emergency brake sensor, a throttle sensor, a lamp switch sensor and a vertical acceleration sensor; and
a database containing at least one file of data selected from:
a road data file including data for at least one of road width, slope, cant, altitude, banking, condition of the road surface, number of lanes, point at which the number of lanes increases or decreases and a point at which a road widens or narrows;

a map data file including data for at least one of nodes, links, coordinates, and names of facilities; and a point-of-interest file including data for at least one of facilities, telephone directory and events.

21. The vehicle control apparatus according to claim 13 wherein said environmental information collection unit includes:

at least one of a GPS signal receiver, a gyro sensor, a shift position sensor, a brake sensor, an emergency brake sensor, a throttle sensor, a lamp switch sensor and a vertical acceleration sensor; and a database containing at least one file of data selected from:

a road data file including data for at least one of road width, slope, cant, altitude, banking, condition of the road surface, number of lanes, point at which the number of lanes increases or decreases and a point at which a road widens or narrows;

a map data file including data for at least one of nodes, links, coordinates, and names of facilities; and a point-of-interest file including data for at least one of facilities, telephone directory and events.

22. The vehicle control apparatus according to claim 14 wherein said environmental information collection unit includes:

at least one of a GPS signal receiver, a gyro sensor, a shift position sensor, a brake sensor, an emergency brake sensor, a throttle sensor, a lamp switch sensor and a vertical acceleration sensor; and a database containing at least one file of data selected from:

a road data file including data for at least one of road width, slope, cant, altitude, banking, condition of the road surface, number of lanes, point at which the number of lanes increases or decreases and a point at which a road widens or narrows;

a map data file including data for at least one of nodes, links, coordinates, and names of facilities; and a point-of-interest file including data for at least one of facilities, telephone directory and events.

\* \* \* \* \*